United States Patent
Maxey et al.

(10) Patent No.: US 11,436,204 B2
(45) Date of Patent: Sep. 6, 2022

(54) ENTERPRISE DATA FLOW LINEAGE FROM ENTERPRISE DATA TESTING METADATA

(71) Applicant: Bank of America Corporation, Charlotte, NC (US)

(72) Inventors: Wyatt Edward Maxey, Charlotte, NC (US); Conor Mitchell Liam Nodzak, Charlotte, NC (US); Kyle Scott Sorensen, Charlotte, NC (US); Sandip Kumar, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 16/893,046

(22) Filed: Jun. 4, 2020

(65) Prior Publication Data

US 2021/0382862 A1 Dec. 9, 2021

(51) Int. Cl.
| | |
|---|---|
| *G06F 16/00* | (2019.01) |
| *G06F 16/215* | (2019.01) |
| *G06F 11/36* | (2006.01) |
| *G06F 16/248* | (2019.01) |
| *G06F 16/25* | (2019.01) |

(52) U.S. Cl.
CPC ........ *G06F 16/215* (2019.01); *G06F 11/3692* (2013.01); *G06F 16/248* (2019.01); *G06F 16/252* (2019.01)

(58) Field of Classification Search
CPC ...... G06F 16/248; G06F 16/252; G06F 16/26; G06F 16/215; G06F 11/3692; G06F 11/3688
See application file for complete search history.

(56) References Cited

U.S. PATENT DOCUMENTS

| | | | | |
|---|---|---|---|---|
| 11,003,645 | B1* | 5/2021 | Thompson | G06F 16/221 |
| 2012/0284223 | A1* | 11/2012 | Belyy | G06F 16/254 |
| | | | | 707/601 |
| 2014/0114907 | A1 | 4/2014 | Kozina et al. | |
| 2014/0115012 | A1 | 4/2014 | Das | |
| 2015/0261824 | A1* | 9/2015 | Jha | G06F 16/951 |
| | | | | 707/690 |
| 2017/0060968 | A1* | 3/2017 | Dhayapule | G06F 11/368 |
| 2017/0277745 | A1 | 9/2017 | Kashalikar et al. | |
| 2018/0181630 | A1* | 6/2018 | He | G06F 16/9024 |
| 2019/0361795 | A1 | 11/2019 | Cole et al. | |
| 2020/0334277 | A1* | 10/2020 | Doyle | G06F 16/245 |

* cited by examiner

*Primary Examiner* — Alexander Khong
(74) *Attorney, Agent, or Firm* — Banner & Witcoff, Ltd.

(57) ABSTRACT

A computing system for managing and mapping source data and target data associated with a data transformation analyzes data quality testing data. Source data and target data include the data elements, data structures, and storage mechanisms for data associated with a data transformation. The computing system analyzes the data quality testing data for validation of the associated data transformation. The computing system identifies source data for input to the data transformation and target data for the result of the data transformation. The computing system stores identifiers associated with the source data and target data and records validated data lineage information for the data transformation. Based on a configuration, the computing system generates a data lineage map indicating the relationships between the source data and the target data associated with a number of data transformations that occur within the computing system.

20 Claims, 8 Drawing Sheets

ENTERPRISE DATA FLOW LINEAGE FROM ENTERPRISE DATA TESTING METADATA

BACKGROUND

Aspects of the disclosure relate to tracking data elements associated with data transformation within a computing system. One or more aspects of the disclosure relate to an intelligent system capable of tracking data elements to map source data and target data associated with a plurality of data transformations in an enterprise computing system.

Today, enterprise organizations (e.g., business organizations, educational institutions, governmental entities, and the like) manage a number of data elements across a variety of business units and platforms. These data elements are typically stored in one or more data repositories, databases, and/or within application data stores throughout an enterprise computing system. In some cases, these data elements are transformed to be used by various applications across the enterprise computing system. These data transformations may require data element inputs from one or more of a variety of source assets (e.g., data stores, applications, and the like) for use in a variety of target assets, while also requiring validation that the transformation has occurred as intended. In some cases, as data elements are transformed across multiple computing systems of the enterprise organization, the reported data lineage information for the source data elements and target data elements utilized in the data transformations can become outdated and/or may be invalid. This may result in delays developing test cases to validate data transformation processes and/or may result in developed test cases that incorporate inaccurate data lineage. Existing systems attempt to track the data lineage for a data transformation within a system through manual entry of data, however, such systems lack robust tracking capabilities across applications and/or computing systems. For example, such existing systems, based on manual entry of reported information, can lead to inaccurate recordation of relationships between the source data elements and target data elements of data transformations. As such, misleading data lineage information creation may result and accurate validation of data transformation may suffer, which may contribute to systematic data tracking deficiencies across the enterprise organization.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately tracking and presenting data lineage information for data transformations within a computing system.

In some cases, an enterprise organization (e.g., business organizations, educational institutions, governmental entities, and the like) may transform data across multiple data storage locations for use in one or more applications and/or platforms of an enterprise computing system. During a data transformation, one or more data elements from one or more source assets (e.g., databases, applications, and the like) may be transformed and then used by and/or stored in one or more target assets. In some cases, individuals associated with the enterprise organization may need to perform data quality testing to validate that data is being created, transformed, and/or aggregated accurately within an enterprise computing system. Data quality testing may involve tracking the source information and target information associated with a specific data transformation to generate an associated test case. After a test case is executed, the validated source information and target information associated with the data transformation may be used to develop future data quality tests. As such, an enterprise computing system may include one or more modules to manage, track, and/or generate data lineage information.

In some cases, the enterprise computing system may include a data testing module including one or more elements (e.g., data stores, engines, generators) to facilitate data quality testing within the enterprise computing system. One or more data stores of the data testing module may store reported data lineage information (e.g., data lineage information self-reported by individuals associated with the enterprise computing system). For example, an individual associated with an application within the enterprise computing system may manually report the source of data elements used within the application (e.g., the data elements are transformed by the application). The reported data lineage information may include source and/or target information for one or more data elements, feeds for the data elements (e.g., files, tables, data structures, and the like), and assets for the feeds (e.g., applications, data stores, and the like). The source information may correspond to target information for an associated data transformation and/or test case within the enterprise computing system.

In some cases, one or more data stores of the data testing module may include executed testing data (e.g., test metadata) associated with one or more test cases executed and/or generated within the data testing module. The information may include the asset (e.g., the application, the data store) associated with data transformation of the test case, the source information for the test case, the target information for the test case, and/or validation information for the test case. In some cases, the data testing module may allow an individual associated with the enterprise computing system to generate and execute automated and/or manual testing procedures for test cases.

In some cases, the enterprise computing system may include one or more applications, such as email client platforms, interne browsers, business productivity applications (e.g., a word processing application, a spreadsheet application, a presentation application, a file management system application, and the like), proprietary enterprise applications, and the like. The one or more applications may perform one or more data transformations using data elements stored within the enterprise computing system. The data transformations may involve data from one or more data sources, where the results of the data transformations may be stored and/or used at one or more targets within the enterprise computing system. In some cases, the enterprise computing system may include one or more data stores associated with storing data (files, folders, tables, databases, and the like) of the enterprise computing system.

In some cases, the enterprise computing system may include an asset lineage module for managing and/or generating data lineage information for one or more data elements within the enterprise computing system. The asset lineage module may include one or more data stores to store information for the assets (e.g., applications, data stores, and the like) associated with source data and/or target data of a data transformation. One or more data stores may include information for the relationship (e.g., the link) between the one or more sources and/or targets for the data transformation. In some cases, the asset lineage module may access and/or analyze the elements of the data testing module to generate data lineage information. The asset lineage module may generate data lineage information for storage in the one or more data stores of the asset lineage module, where the stored data may be analyzed and/or combined to generate a map representing the relationships (e.g., the links) between source data and target data of the enterprise computing system. The map may depict the directional nature of the relationships (e.g., source asset to target asset) and may include the links between assets corresponding to different data transformations.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
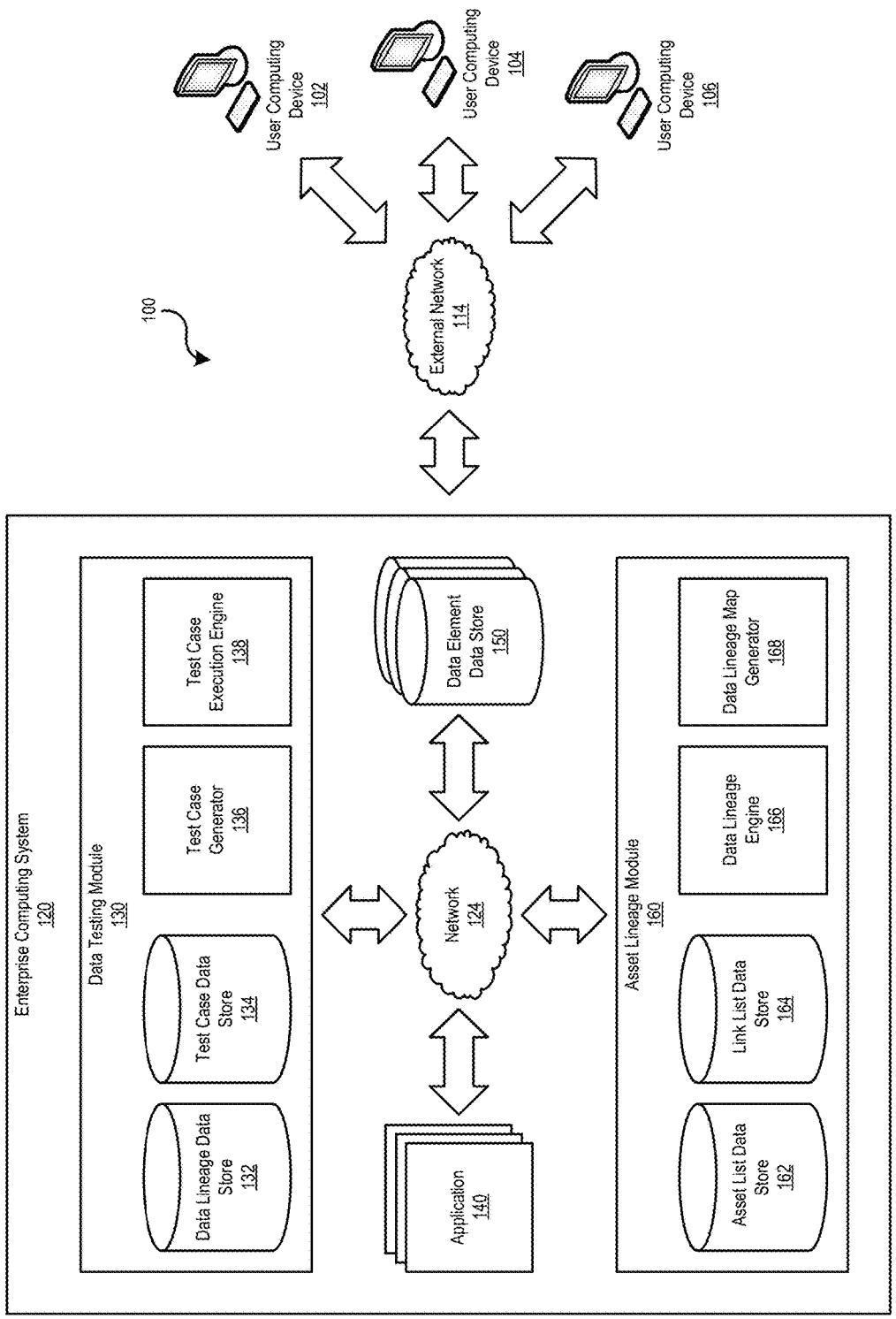
FIG. 1 depicts an illustrative computing environment for tracking elements of testing data to map the source data and target data associated with assets of an enterprise computing system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

A need has been identified for an improved and robust system capable of tracking data lineage across an enterprise computing system. Aspects described herein are directed to developing a system for managing, tracking, and mapping source data and target data used in data transformations within an enterprise computing system.

Today, many enterprise organizations (e.g., business organizations, educational institutions, governmental entities, and the like) maintain computing systems that transform, modify, and/or combine data across multiple areas of the enterprise organization. During a data transformation, one or more data elements from one or more source assets (e.g., databases, applications, and the like) may be transformed and proceed to be used and/or stored in one or more target assets (e.g., databases, applications, and the like). Data elements may be transformed, altered, and/or introduced at multiple steps within a data transformation process, leading to a high degree of complexity in tracking data lineage. In some cases, individuals associated with the enterprise organization may perform data quality testing to validate that data is being created, transformed, and/or aggregated accurately as the data undergoes transformation within an enterprise computing system. Validating a specific data transformation may require tracking the source data elements and target data elements associated with the data transformation, so that one or more test cases may be developed using the appropriate source data elements and target data elements. As such, an enterprise computing system may require improved systems, processes, and/or methods to manage and present data lineage information.

In some cases, the enterprise computing system may be accessible by one or more computing devices (e.g., a cell phone, a laptop computer, a tablet, and the like) associated with users of the enterprise computing system. The one or more computing devices may interface with the enterprise computing system via a network. The one or more computing devices may configure, manage, and/or execute the functionality of the enterprise computing system. In some cases, the enterprise computing system may include one or more data stores for storing data elements of the enterprise computing system. The one or more data stores may contain one or more files, folders, databases, and the like. The content stored in the one or more data stores may be available for access by the elements of the enterprise computing system. In some cases, the enterprise computing system may include one or more applications. The one or more applications may include email client platforms, internet browsers, business productivity applications (e.g., a word processing application, a spreadsheet application, a presentation application, a file management system application and the like), proprietary enterprise applications, and the like. The one or more applications may perform one or more data transformations using data elements stored within the enterprise computing system. The one or more data transformations may involve data from one or more sources within the enterprise computing system. The results of the one or more data transformations involving the one or more source data elements may directed to one or more targets within the enterprise computing system. For example, an application may extract data from a spreadsheet file and a database (e.g., the source assets), perform a data transformation, and store the transformation data in a new spreadsheet file (e.g., the target asset) as a part of a data transformation.

In some cases, the enterprise computing system may include a data testing module associated with generating, configuring, and/or executing data quality testing. The data testing module may include one or more elements (e.g., data stores, engines, generators) to facilitate and/or execute data quality testing within the enterprise computing system. The data testing module may include a data lineage data store. The data lineage data store may store information associated with reported data lineage (e.g., data lineage information reported by individuals associated with the enterprise computing system). For example, an individual associated with an application within the enterprise computing system may manually track and report the observed data lineage for data elements that are used within the application (e.g., the data elements are transformed within the application). In some cases, the reported data lineage information may be incomplete and/or outdated. For example, the reported data lineage information for data elements transformed by a particular application may be accurate for that particular application, but may be missing data lineage information for specific data elements that interact with other applications within the enterprise computing system.

The reported data lineage information may include source information for one or more source data elements, source feeds for the source data elements (e.g., files, tables, data structures, and the like), and source assets for the source feeds (e.g., applications, data stores, and the like). The source information may be associated with a specific data transformation and/or test case within the enterprise computing system. In some cases, the reported data lineage information may include target information for one or more target data elements, target feeds for the target data elements (e.g., files, tables, data structures, and the like), and target assets for the target feeds (e.g., applications, data stores, and the like). The target information may be associated with one or more specific data transformations and/or test cases within the enterprise computing system.

In some cases, the data testing module may include a test case data store. The test case data store may include information associated with one or more test cases generated, configured, and/or executed by the data testing module. In some cases, the data testing module may include a test case generator. The test case generator may be configured by the one or more computing devices associated with users of the enterprise computing system. Using the test case generator, the one or more users may configure and/or generate test cases to validate data transformations within the enterprise computing system. The test case generator may allow a user to generate automated testing procedures for test cases (e.g., a testing script) and/or allow a user to generate test cases for manual execution (e.g., a data level walkthrough). In some cases, the data testing module may include a test execution engine. The test execution engine may receive the one or more test cases from the test case generator. After receiving the one or more test cases from the test case generator, the test execution engine may execute the one or more test cases by automatic and/or manual procedures, based on the configuration of the test case defined in the test case generator. For example, a user may configure a test case that includes an automated testing script designed to reflect the associated data transformation.

In some cases, the enterprise computing system may include an asset lineage module. The asset lineage module may manage and/or generate data lineage information for one or more data elements within the enterprise computing system. The asset lineage module may include an asset list data store. The asset list data store may store information for the asset (e.g., application, data store) for which a data element is a source and/or a target in a data transformation. In some cases, the asset lineage module may include a link list data store. The link list data store may include information for the relationship (e.g., the link) between the one or more sources and targets for an associated data transformation. In some cases, the asset lineage module may include a data lineage engine. The data lineage engine may access the elements of the data testing module in order to generate date lineage information. The data lineage engine may analyze the contents of the data lineage data store, the test case data store, and/or the one or more data stores of the enterprise computing system containing data elements used in data transformations. In some cases, based on analysis of the contents of the data testing module and/or the metadata associated with executed test cases, the data lineage engine may determine the data lineage for one or more data elements of the enterprise computing system.

In some cases, the data lineage engine may generate asset information for the asset list data store and/or link information for the link list data store. For example, if a first source asset and a second source asset are used in a data transformation for a first target asset, the data lineage engine may store the first source asset, the second source asset, and the first target asset in the asset list data store if they have not been previously listed, while also storing the links between each asset (e.g. first source to first target, second source to first target) in a link list data store. In some cases, the asset lineage module may include a data lineage map generator. The data lineage map generator may analyze the information stored in the asset list data store and/or the link list data store to generate a data lineage map representing links between the assets of the enterprise computing system. The map may show the directional aspect of the links (e.g., source to target) and the links between assets corresponding to different data transformations within the enterprise computing system.

FIG. 1 depicts an illustrative computing environment 100 for tracking elements of data quality testing data to map the source data and target data associated with data transformations within an enterprise computing system 120 in accordance with one or more aspects described herein. The illustrative computing environment 100 may include one or more user computing devices (e.g., user computing device 102, 104, 106). The one or more user computing devices (e.g., 102, 104, 106) may be one of a mobile device, a tablet, a laptop computer, a desktop computer and/or the like. The user computing device 102 may be communicatively coupled to one or more external networks 114 (e.g., a telecommunications network, the Internet, a Wi-Fi network, and the like) and/or networks 124 in the illustrative computing environment 100. In some cases, the external network 114 may be a wired or wireless network, such as the networks described below with respect to FIGS. 4 and 5.

In some cases, the illustrative computing environment 100 may include an enterprise computing system 120. The one or more user computing devices (e.g., 102, 104, 106)

may access elements of the enterprise computing system 120 via the external network 114 and/or the network 124. The enterprise computing system 120 may be operated by an enterprise organization (e.g., a business organization, an educational institution, a governmental entity, and the like). The enterprise computing system 120 may include one or more networks 124 (e.g., a telecommunications network, the Internet, a Wi-Fi network, and the like). In some cases, the network 124 may be a wired or wireless network, such as the networks described below with respect to FIGS. 4 and 5. In some cases, the one or more user computing devices (e.g., 102, 104, 106) may be included within the enterprise computing system 120 and be communicatively coupled to the network 124.

In some cases, the enterprise computing system 120 may include one or more applications 140. The one or more applications 140 may include email client platforms, internet browsers, business productivity applications (e.g., a word processing application, a spreadsheet application, a presentation application, a file management system application and the like), proprietary enterprise applications, and the like. In some cases, the one or more applications 140 may utilize data that is accessible within the enterprise computing system 120. The data may be stored directly within the enterprise computing system 120 (e.g. stored on servers associated with the enterprise computing system 120 accessible via network 124) and/or may accessed via external network 114. Using the data, the one or more applications 140 may perform one or more data transformations according to their functionality. For example, a music production application may fetch one or more audio files stored within the enterprise computing system 120 and alter and/or combine the audio files for use within the music production application (e.g., application 140). The one or more data transformations may involve data from one or more sources (e.g., files, applications 140, data stores 150) that are stored and/or used with one or more targets (e.g. files, applications, data stores) within the enterprise computing system 120. For example, an application 140 may fetch data (e.g., the source data elements) from a spreadsheet file and a first database (e.g., the source assets), perform a data transformation, and store the transformed data (e.g., the target data elements) in a data table of a second database (e.g., the target asset) as a part of a data transformation.

In some cases, the enterprise computing system 120 may include one or more data element data stores 150 to store the data elements of the enterprise computing system 120. The one or more data element data stores 150 may contain one or more files, folders, databases, and the like. In some cases, the one or more applications 140 may be stored within the one or more data element data stores 150. The contents of the one or more data element data stores 150 may be transformed by the one or more applications 140 and/or other elements of the enterprise computing system 120 according to their functionality. In some cases, the one or more data element data stores 150 may contain one or more elements that will function as source assets (e.g., applications 140, programs, databases), source feeds (e.g., files, data tables), and/or source data elements (e.g., input data elements to a data transformation) in a data transformation within the enterprise computing system 120. In some cases, each source asset, source feed, and/or source data element may be assigned a unique identifier. In some cases, the one or more data element data stores 150 may contain one or more elements that will function as target assets (e.g., applications 140, programs, databases), target feeds (e.g., files, data tables), and/or target data elements (e.g., output data elements from a data transformation) in a data transformation within the enterprise computing system 120. In some cases, each target asset, target feed, and/or target data element may be assigned a unique identifier.

In some cases, the enterprise computing system 120 may include a data testing module 130. The data testing module 130 may include one or more elements (e.g., data stores, engines, modules, and/or generators) associated with data quality testing within the enterprise computing system 120. The data testing module 130 may be accessible by the one or more user computing devices (e.g., 102, 104, 106) via network 124 and/or external network 114. In some cases, the data testing module 130 may include a data lineage data store 132. Additionally or alternatively, in some cases, the data lineage data store 132 may be located outside the data testing module 130. The data lineage data store 132 may include information associated with the data lineage of data assets, data feeds, and/or data elements stored in the one or more data element data stores 150. In some cases, the data lineage information stored in the data lineage data store 132 may be reported by one or more individuals associated with the enterprise computing system 120. For example, a developer associated with an enterprise financial application (e.g., 140) within the enterprise computing system 120 may manually track and report data lineage information for the data elements (e.g., user account information, financial market information) that are used within the enterprise financial application (e.g., the data elements are transformed within the application 140). In some cases, the reported data lineage information may be incomplete and/or outdated. For example, the developer associated with an enterprise financial application (e.g., 140) may report the data lineage information for the data elements (e.g., user account information, financial market information) that are used within the enterprise financial application, but may not be aware that the same data elements are used in a separate personal finance application (e.g., 140) within the enterprise computing system 120. As such, the developer may not report that the data elements used within the enterprise financial application are also used within the personal finance application.

In some cases, the information stored in the data lineage data store 132 may include source information for one or more source data elements, source feeds for the source data elements (e.g., files, tables, data structures, and the like), and/or source assets for the source feeds (e.g., applications 140, data stores 150, and the like). The source information may be associated with one or more specific data transformations and/or test cases within the enterprise computing system 120. For example, generating a United States Dollar (USD) conversion in a financial application may require fetching a currency amount from a data table in a first database and fetching a conversion rate from data table in a second database. As such, the currency conversion transformation has 2 associated source assets (e.g., the databases), 2 associated source feeds (e.g., the data tables), and 2 data elements (e.g., the fields containing the currency amount and the conversion rate). In some cases, the data lineage information may include target information for one or more target data elements, target feeds for the target data elements (e.g., files, data tables, and the like), and target assets for the target feeds (e.g., applications 140, data stores 150, and the like). The target information may be associated with a specific data transformation and/or test case within the enterprise computing system 120. For example, the result of a USD conversion in a financial application may be stored in a field of a table displayed at a user interface of the financial application. As such, the currency conversion transformation has 1 associated target asset (e.g., the financial application), 1 associated target field (e.g., the data table), and 1 target data element (e.g., the field containing the USD conversion in the data table).

In some cases, the data testing module 130 may include a test case data store 134. The test case data store 134 may include information associated with one or more test cases generated, configured, and/or executed by the data testing module 130 to validate the data transformations that occur within the enterprise computing system 120. The information may include the assets (e.g., applications 140, data stores 150) performing the data transformation, the source information, the target information, validation information for the test case (e.g., successful test, failed test), and/or the test case metadata associated with the one or more test cases. In some cases, the data testing module 130 may include a test case generator 136. The test case generator 136 may be configured by the one or more user computing devices (e.g., 102, 104, 106) that are capable of interfacing with the enterprise computing system 120. Using the test case generator 136, the one or more user computing devices (e.g., 102, 104, 106) may configure and/or generate test cases to validate data transformations within the enterprise computing system 120. In some cases, the test case generator 136 may allow a user to generate an automated testing procedure for a test case (e.g., a testing script). In some cases, the test case generator 136 may allow a user to generate a manually executed test case (e.g., a data level walkthrough). The test case generator 136 may include a user interface accessible via a user computing device (e.g., 102, 104, 106) where a user may define the sources and targets associated with the test case. In some cases, the test case generator 136 may fetch data from the data lineage data store 132 and/or the test case data store 134. The test case generator 136 may use the data from the data lineage data store 132 and/or the test case data store 134 to generate new test cases and/or modify existing test cases.

In some cases, the data testing module 130 may include a test execution engine 138. The test execution engine 138 may execute the one or more test cases generated and/or modified by the test case generator 136. The test execution engine 138 may execute the one or more test cases by automatic and/or manual testing procedures, based on the configuration of the test case defined in the test case generator 136. For example, a user may configure a test case that includes data level walkthrough (e.g., a manual test case procedure), where the user may proceed step by step through the data transformation associated with the test case. In some cases, the result of executed test case may be stored in the test case data store 134. The metadata of the executed test case may include data lineage validation information for the data elements associated with the test case. The data lineage validation information may be stored in the data lineage data store 132. The data lineage validation information may include validated information for the sources (e.g., assets, feeds, data elements) and/or targets (e.g., assets, feeds, data elements) associated with the data transformation that was tested through execution of the test case. For example, the metadata for an executed test case may indicate that the sources for a data transformation were a first field of a first data table and a second field of a second data table stored in the data element data store 150. The metadata for the executed test case may indicate that the target for the data transformation was a field displayed at a user interface of an application 140, where the application 140 fetched the information of first field of a first data table and a second field of a second data table via the network 124 and proceeded to perform a data transformation.

In some cases, the enterprise computing system 120 may include an asset lineage module 160. The asset lineage module 160 may manage, track, and/or generate data lineage information for the one or more data transformations that occur within the enterprise computing system 120. In some cases, the asset lineage module 160 may access information stored in the data stores (e.g. 132, 134) of the data testing module 130 to perform one or more of the operations described herein. For example, elements (e.g., a data lineage engine 166) of the asset lineage module 160 may retrieve data lineage information for a specific data transformation from the data lineage data store 132 via the network 124.

In some cases, the asset lineage module 160 may include an asset list data store 162. The asset list data store 162 may store information for the associated source and/or target assets (e.g., applications 140, data stores 150), feeds (e.g., files, data structures), and/or data elements used in a data transformation. For example, a data transformation within a loan tracking application (e.g., 140) may involve retrieving credit score data and loan amount data for a specific client to generate an interest rate within the loan tracking application. The credit score data may be located in an external $3^{rd}$ party database, while the loan amount data may be located in a loan amount data store (e.g., 150) of the enterprise computing system 120. As such, for the data transformation involving generating an interest rate within the loan tracking application, unique identifiers for both the external $3^{rd}$ party database and loan amount data store (e.g., 150) may be listed as source assets in the asset list data store 162, while a unique identifier for the loan tracking application is listed as a target asset in the asset list data store 162. In some cases, unique identifiers for the individual source feeds, source data elements, target feed, and/or target data element for a data transformation may listed in the asset list data store 162. For example, the credit score data may reside in a data element "Element1" of a data structure "Table1" (e.g., the feed) stored in the external 3rd party database. The loan amount data may reside in a data element "Element4" of a data spreadsheet "Sheet1" (e.g., the feed) that is stored in the loan amount data store. The result of the generating the interest rate (e.g., the data transformation) may be stored in a data element "RateResult" of a data structure "ClientData" (e.g., the feed) of the loan tracking application. Accordingly, "Element1" and/or "Element 4" may be listed as source data elements and "RateResult" may be listed as a target data element in the asset list data store 162. Additionally or alternatively, "Table1" and/or "Sheet1" may be listed as source feeds and "ClientData" may be listed as a target feed in the asset list data store 162. In some cases, elements (e.g., data elements, feeds, targets) may listed as both a source and a target in the asset list data store 162 based on the use of the element in a data transformation.

In some cases, the asset lineage module 160 may include a link list data store 164. The link list data store 164 may include information for the relationship (e.g., the link) between the one or more sources and the target of an associated data transformation. The link list data store 164 may list the relationship (e.g., link) information between a source and a target in a data transformation. The relationship information may include directional information for the link between the unique identifiers of the assets. For example, a data transformation within a loan tracking application (e.g., 140) may involve retrieving credit score data and loan amount data for a specific client to generate an interest rate within the loan tracking application. The credit score data may be located in an external 3$^{rd}$ party database, while the loan amount data may be located in a loan amount data store (e.g., 150) of the enterprise computing system 120. As such, for the data transformation involving generating an interest rate within the loan tracking application, a link between the identifier of the external 3$^{rd}$ party database to the identifier of the loan tracking application and/or a link between the identifier of the loan amount data store to the identifier of the loan tracking application may be listed in the link list data store 164. In some cases, the one or more links between the individual source feeds and/or source data elements to the target feed and/or target data element may listed in the link list data store 164. For example, the credit score data may reside in a data element "Element1" of a data structure "Table1" (e.g., the feed) stored in the external 3rd party database. The loan amount data may reside in a data element "Element4" of a data spreadsheet "Sheet1" (e.g., the feed) that is stored in the loan amount data store. The result of the generating the interest rate (e.g., the data transformation) may be stored in a data element "RateResult" of a data structure "ClientData" (e.g., the feed) of the loan tracking application. Accordingly, a link between "Element1" to "RateResult" and/or between "Element4" to "RateResult" may be listed in the link list data store 164. Additionally or alternatively, a link between "Table1" to "ClientData" and/or between "Sheet1" to "ClientData" may be listed in the link list data store 164.

In some cases, the asset lineage module 160 may include a data lineage engine 166. The data lineage engine 166 may access the elements (e.g., the data lineage data store 132, the test case data store 134) of the data testing module 130. The data lineage engine 166 may analyze the contents of the data lineage data store 132, the test case data store 134, and/or the one or more data stores (e.g., 150) of the enterprise computing system 120 containing data elements used in data transformations. In some cases, based on analysis of the contents of the data testing module 130 and/or the metadata associated with executed and/or validated test cases from the test case data store 134, the data lineage engine 166 may determine the data lineage information for one or more data elements associated with data transformations within the enterprise computing system 120.

In some cases, the data lineage engine 166 may analyze executed and/or validated testing data from the test case data store 134. Using the executed and/or validated testing data (e.g., test case metadata, testing log files, and the like), the data lineage engine 166 may generate source information and/or target information for a data transformation associated with a test case. Using the source information and/or the target information, the data lineage engine 166 may generate validated data lineage information and/or store the validated data lineage information in the data lineage data store 132. The validated data lineage information may be stored with an indicator corresponding to the associated test case in the test case data store 134. In some cases, the data lineage engine 166 may analyze the data lineage information stored in the data lineage data store 132. The data lineage engine 166 may compare the data lineage information to the test case information stored in the test case data store 134 to verify that the stored data lineage for a data transformation corresponds to the validated data lineage information from the test case metadata. In some cases, the data lineage engine 166 may replace and/or remove data lineage information that is incorrect, invalid, and/or outdated in the data lineage data store 132 based on the validated testing information.

In some cases, the data lineage engine 166 may generate asset information for the asset list data store 162. The asset information may be generated based on the information of the data lineage data store 132 and/or test case data store 134. In some cases, asset information may be generated based on validated testing information (e.g., test case metadata) for a data transformation. Asset information may include associated source and/or target assets (e.g., applications 140, data stores 150), feeds (e.g., files, data structures), and/or data elements used in a data transformation. In some cases, the asset information may include unique identifiers for each asset, feed, and/or data element. The asset information generated by the data lineage engine 166 may be separated at the asset level, the feed level, and/or the data element level for a data transformation. The generated asset information may be stored in lists of the asset list data store 162. In some cases, generated asset information may not be stored in the asset list data store 162 if the generated asset information already exists in the asset list data store 162. For example, the data lineage engine 166 may analyze validated test case metadata for a data transformation in the test case data store 134. Analysis of the test case metadata by the data lineage engine 166 may recognize that a first source asset and a second source asset are used in a data transformation, where the result of the data transformation is stored at a first target asset. Unique identifiers for the first source asset and the first target asset may exist in the asset list data store 162 in a source asset list and a target asset list. Accordingly, the data lineage engine 166 may only generate asset information for the second source asset and store the asset information (e.g., information indicating the second source asset as a source asset) in the asset list data store 162.

In some cases, the data lineage engine 166 may generate link information for the link list data store 164. Link information may indicate a link between a source and a target of a data transformation. The link information may be generated based on the information of the data lineage data store 132 and/or test case data store 134. In some cases, link information may be generated based on validated testing information (e.g., test case metadata) for a data transformation. Link information may include associated relationships (e.g., links, timing of observation, metadata, and the like) between source and/or target assets (e.g., applications 140, data stores 150), feeds (e.g., files, data structures), and/or data elements used in a data transformation. For example, an identified link between a source asset and target asset may include metadata, such as the date and/or time the link was identified, information for the test case associated with identifying the link, and the like. The link information generated by the data lineage engine 166 may be separated at the asset level, the feed level, and/or the data element level for a data transformation. The generated link information may be stored in lists of the link list data store 164.

In some cases, generated link information may not be stored in the link list data store 164 if the generated link information already exists in the link list data store 164. For example, the data lineage engine 166 may analyze validated test case metadata stored in the test case data store 134. Analysis of the metadata by the data lineage engine 166 may recognize that a first source asset and a second source asset are used in a data transformation for a first target asset. The link between first source asset and the first target asset may preexist in the link list data store 164 in a link list. Accordingly, the data lineage engine 166 may only generate link information for the link between the second source asset and first target asset and store the link information in the link list data store 164. In some cases, existing link information may be updated in the link list data store 164. For example, the data lineage engine 166 may analyze validated test case metadata stored in the test case data store 134. Analysis of the metadata by the data lineage engine 166 may include determining that a first source asset and a second source asset are used in a data transformation for a first target asset. The link between first source asset and the first target asset may preexist in the link list data store 164 in a link list. Accordingly, the data lineage engine 166 may update the link information (e.g., date and/or time when the link was validated, information for the test case associated with identifying the link) with the identified pre-existing link information for the link between the first source asset and first target asset in the link list data store 164.

In some cases, the asset lineage module 160 may include a data lineage map generator 168. The data lineage map generator 168 may analyze the information stored in the asset list data store 162 and/or the link list data store 164 to generate one or more data lineage maps. The one or more data lineage maps may represent the links between the assets, feeds, and/or data elements associated with one or more data transformations of the enterprise computing system 120. Each asset, feed, and or data element in the asset list data store 162 may be represented as a node within a data lineage map. The relationship between each asset, feed, and/or data element to another asset, feed, and/or data element may be represented as a link in the data lineage map. The configuration of the data lineage map may be configured by a user computing device (e.g., 102, 104, 106) within the data lineage map generator 168. Additionally or alternatively, the configuration of the data lineage map may be preconfigured by the enterprise organization within the data lineage map generator 168. In some cases, a data lineage map may be restricted to map for a data transformation and/or a test case. Additionally or alternatively, in some cases, the data lineage map may be restricted to nodes and links at the asset level, feed level, and/or data element level. In some cases, the one or more maps may show the directional aspect between the links (e.g., source to target).

Figure 2:
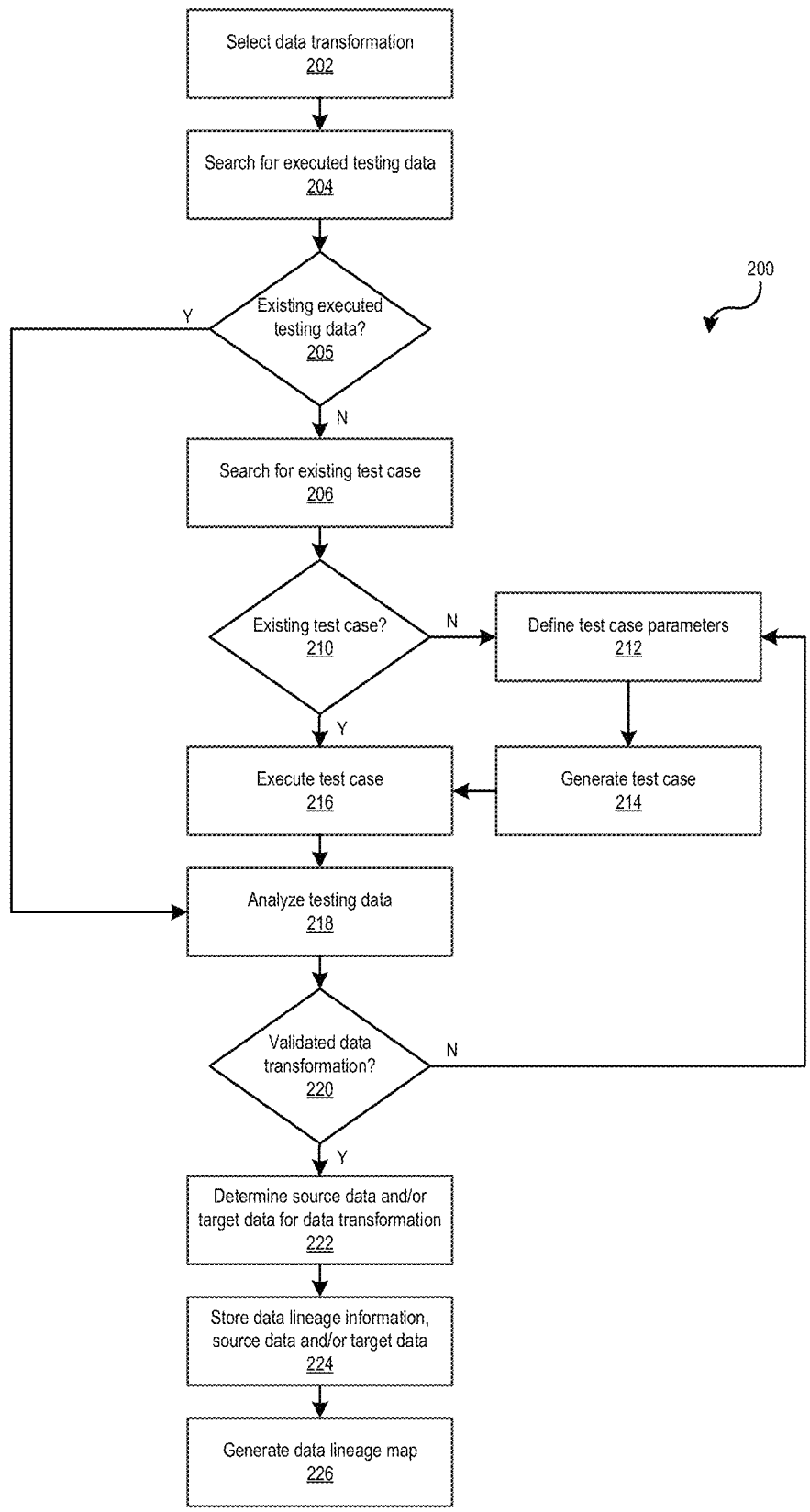
FIG. 2 depicts an illustrative event sequence for analyzing data quality testing data to map the source data and target data associated with data transformation within an enterprise computing system in accordance with one or more aspects described herein.

FIG. 2 depicts an illustrative event sequence 200 for analyzing data quality testing data to map the source data and target data associated with data transformation within an enterprise computing system 120 in accordance with one or more aspects described herein. The events shown in the illustrative event sequence 200 are illustrative and additional events may be added, or events may be omitted, without departing from the scope of the disclosure. At 202, at a user computing device (e.g. 102) and via a network (e.g., 114, 124), a user may access the enterprise computing system 120 and select a data transformation in the data testing module 130 and/or the asset lineage module 160 to generate and/or analyze the data lineage information associated with the data transformation. The data transformation may be associated with a particular application 140, program, and/or process of the enterprise computing system 120. In some cases, the data lineage engine 166 may be configured to automatically select a data transformation at 202 in the data testing module 130 and/or the asset lineage module 160. At 204, the data lineage engine 166 may search the data lineage data store 132 and/or the test case data store 134 for executed data quality testing data associated with the selected data transformation. The data quality testing data may include the information for data transformation tested, the sources of data transformed, the target of data transformed, the method of the test (e.g., automatic, manual), the result of the test (e.g., success, failure, and the like), validation of the correct sources/target, and/or other test metadata.

If executed data quality testing data exists for the data transformation at 205, the executed data quality testing data may be analyzed by the data lineage engine 166 at 218. If executed data quality testing data does not exist for the data transformation at 205, the data lineage engine 166 may search the data testing module 130 and/or the elements of the data testing module 130 (e.g., the data lineage data store 132, the test case data store 134) for an existing test case associated with the data transformation. For example, executed data quality testing data may not exist for a data transformation if a data quality test has not been executed by the test execution engine 138, but a test case associated with data quality testing for the data transformation may already exist in the test case data store 134. If a test case for the data transformation does not exist at 210, the user may define the parameters of the test case at 212 within the test case generator 136. Additionally or alternatively, in some cases, the data testing module 130 may automatically generate parameters for the test case in the test case generator 136 based on analysis of the data lineage data store 132. After test case parameters are defined at 212, the test case for the data transformation may be generated by the test case generator 136 at 214. After the test case is generated at 214, the test case may be executed by the test execution engine 138 at 216. The test case may include automatic and/or manual test procedures based on the configuration defined in the test case generator 136. If a test case for the data transformation does exist at 210, the test case may be executed by the test execution engine 138 in a data quality test at 216.

After execution of the test case at 216, the executed data quality testing data may be analyzed by the data lineage engine 166 at 218. The data lineage engine 166 may identify the data transformation tested, the sources of data transformed, the target of data transformed, the method of the test, the result of the test (e.g., success, failure, and the like), validation of the correct sources/target, and/or other test metadata. In some cases, the data lineage engine 166 may store the executed data quality testing data in the test case data store 134. If the executed data quality testing data is validated (e.g., the sources, the target, and/or the data transformation are/is correct) at 220, the data lineage engine 166 may determine the source data (e.g., assets, feeds, and data elements) and target data (asset, feed, and data elements) of the data transformation at 222. In some cases, the data lineage engine 166 may determine the associated unique identifiers for the source data and target data. Additionally or alternatively, at 222, the data lineage engine 166 may determine the asset information for the associated source and/or target assets (e.g., applications 140, data stores 150), feeds (e.g., files, data structures), and/or data elements used in the data transformation. Additionally or alternatively, at 222, the data lineage engine 166 may determine the link information for the data transformation, including associated relationships (e.g., links) between source and/or target assets (e.g., applications 140, data stores 150), feeds (e.g., files, data structures), and/or data elements used in a data transformation. If the executed data quality testing data is not validated (e.g., the sources, the target, and/or the data transformation are/is incorrect) at 220, the parameters of the test case associated with the data transformation may be defined within the test case generator 136 at 212 as described herein.

After the source data (e.g., assets, feeds, and data elements) and target data (asset, feed, and data elements) for the data transformation is determined at 222, the data lineage information, source data, and/or target data for the data transformation may be stored in the data testing module 130 and/or the asset lineage module 160. In some cases, the data lineage information that is stored in the data lineage data store 132 may overwrite and/or replace existing data lineage information for the data transformation stored in the data lineage data store 132. In some cases, the executed data quality testing data and/or executed test case may be stored in the test case data store 134 at 224. Additionally or alternatively, at 224, the asset information for the associated source and/or target assets (e.g., applications 140, data stores 150), feeds (e.g., files, data structures), and/or data elements used in the data transformation may be stored in the asset list data store 162 at 224. In some cases, unique identifiers corresponding to elements (e.g., assets, feeds, data elements) of the asset information may be stored in the asset list data store 162 at 224. Additionally, or alternatively, at 224, the link information for the data transformation, including associated relationships (e.g., links) between source and/or target assets (e.g., applications 140, data stores 150), feeds (e.g., files, data structures), and/or data elements used in a data transformation may be stored in the link list data store 164. After storing the data lineage information, source data, and/or target data for the data transformation at 224, the data lineage map generator 168 may analyze the stored asset data of the asset list data store 162 and the link data of the link list data store 164 to generate a data lineage map. The configuration of the data lineage map may be configured by a user computing device 102 within the data lineage map generator 168. The data lineage map may correspond to one or more assets and/or one or more links for the data transformation and/or one or more additional data transformations of the enterprise computing system 120. For example, a user may configure the data lineage map generator 168 to generate a map of the assets and links for a specific data transformation, or for a group of data transformations associated with an application 140.

Figure 3A:
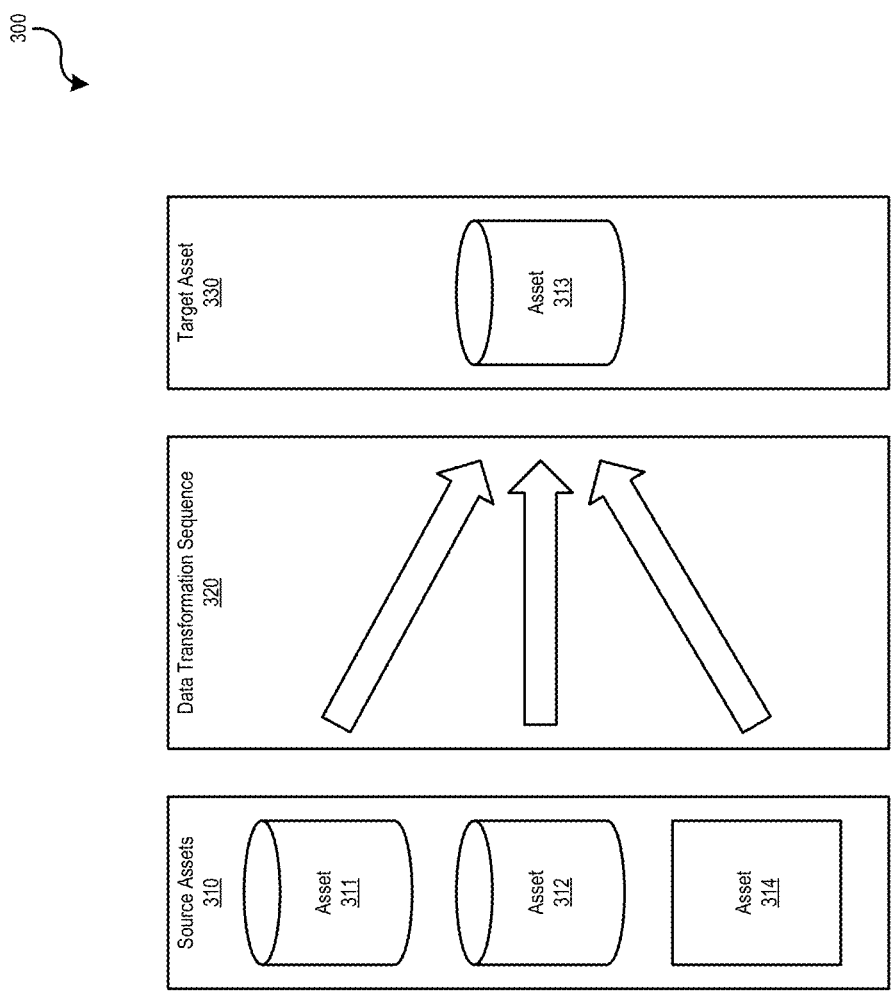
FIG. 3A shows an illustrative data transformation involving source assets and a target asset of the enterprise computing system in accordance with one or more aspects described herein.

FIG. 3A shows an illustrative data transformation 300 involving source assets and a target asset of the enterprise computing system 120 in accordance with one or more aspects described herein. The data transformation 300 within the enterprise computing system 120 may involve one or more source assets 310. The source assets 310 (e.g., asset 311, asset 312, asset 314) may include applications 140, data stores (e.g., data element data stores 150) within and/or external to the enterprise computing system 120. The data transformation 300 within the enterprise computing system 120 may involve a target asset 330 (e.g., asset 313). The target asset 330 (e.g., asset 313) may include applications 140, data stores (e.g., data element data stores 150) within and/or external to the enterprise computing system 120. The data transformation 300 may involve a data transformation sequence 320 that combines, modifies, and/or transforms the data elements associated with the source assets 310. The data transformation sequence 320 may be associated with an application 140, program, and/or process of the enterprise computing system 120. The result of the data transformation sequence 320 may be stored and/or otherwise used at a data element of the target asset 330 (e.g., asset 313). For example, a personal finance application (e.g., application 140) within the enterprise computing system 120 may take input data elements from data stores (e.g., asset 311, asset 312) and an enterprise banking application (e.g., asset 314) to calculate a wealth metric for a user. The personal finance application may calculate the wealth metric (e.g., execute the data transformation) using the data elements from the source assets 310 and store the result of the data transformation in a field within the personal finance application (e.g., asset 313) as the target asset 330. In some cases, the illustrative data transformation 300 may be modified and/or altered to display source/target feeds and/or source/target data elements in place of the source assets 310 and target asset 330.

Figure 3B:
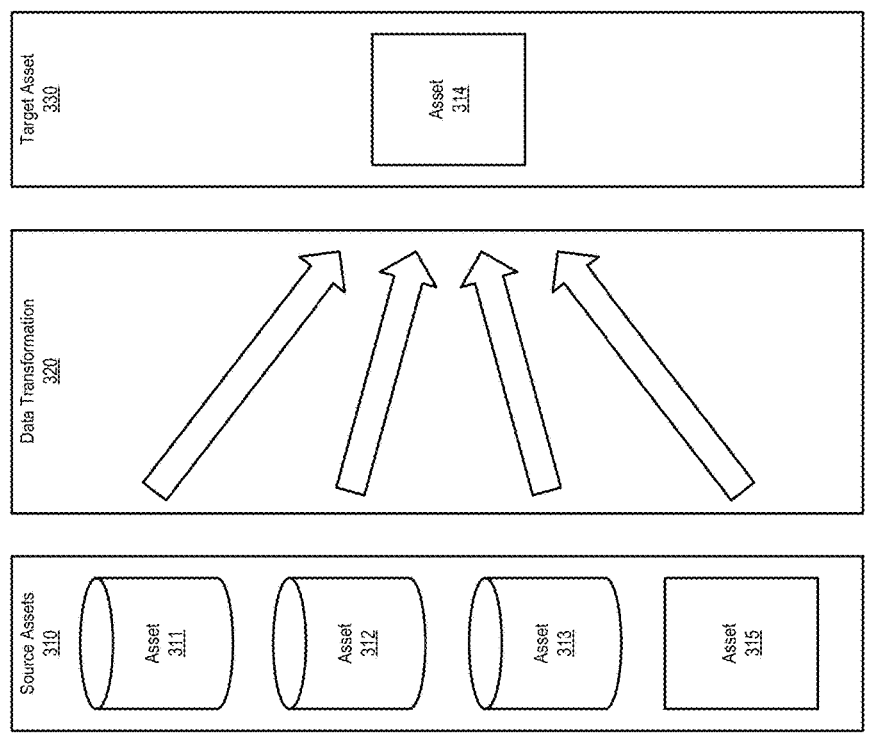
FIG. 3B shows an illustrative data transformation involving source assets and a target asset of the enterprise computing system in accordance with one or more aspects described herein.

FIG. 3B shows an illustrative data transformation 302 involving source assets and a target asset of the enterprise computing system 120 in accordance with one or more aspects described herein. The data transformation 302 within the enterprise computing system 120 may involve one or more source assets 310. The source assets 310 (e.g., asset 311, asset 312, asset 313 asset 315) may include applications 140, data stores (e.g., data element data stores 150) within and/or external to the enterprise computing system 120. The data transformation 302 within the enterprise computing system 120 may involve a target asset 330 (e.g., asset 314). The target asset 330 (e.g., asset 314) may include applications 140, data stores (e.g., data element data stores 150) within and/or external to the enterprise computing system 120. The data transformation 302 may involve a data transformation sequence 320 that combines, modifies, and/or transforms the data elements associated with the source assets 310. The data transformation sequence 320 may be associated with an application 140, program, and/or process of the enterprise computing system 120. The result of the data transformation sequence 320 may be stored and/or otherwise used at a data element of the target asset (e.g., asset 314). In some cases, the illustrative data transformation 302 may be modified and/or altered to display source/target feeds and/or source/target data elements in place of the source assets 310 and target asset 330.

Figure 3C:
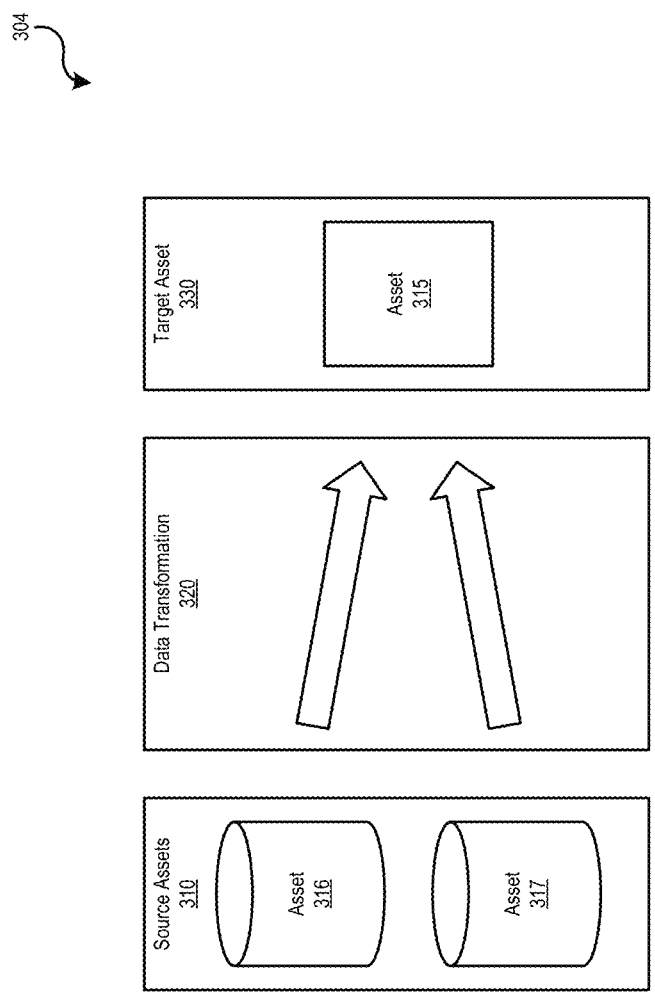
FIG. 3C shows an illustrative data transformation involving source assets and a target asset of the enterprise computing system in accordance with one or more aspects described herein.

FIG. 3C shows an illustrative data transformation 304 involving source assets and a target asset of the enterprise computing system 120 in accordance with one or more aspects described herein. The data transformation 304 within the enterprise computing system 120 may involve one or more source assets 310. The source assets 310 (e.g., asset 316, asset 317) may include applications 140, data stores (e.g., data element data stores 150) within and/or external to the enterprise computing system 120. The data transformation 304 within the enterprise computing system 120 may involve a target asset 330 (e.g., asset 315). The target asset 330 (e.g., asset 315) may include applications 140, data stores (e.g., data element data stores 150) within and/or external to the enterprise computing system 120. The data transformation 304 may involve a data transformation sequence 320 that combines, modifies, and/or transforms the data elements associated with the source assets 310. The data transformation sequence 320 may be associated with an application 140, program, and/or process of the enterprise computing system 120. The result of the data transformation sequence 320 may be stored and/or otherwise used at a data element of the target asset (e.g., asset 315). In some cases, the illustrative data transformation 304 may be modified and/or altered to display source/target feeds and/or source/target data elements in place of the source assets 310 and target asset 330.

Figure 3D:
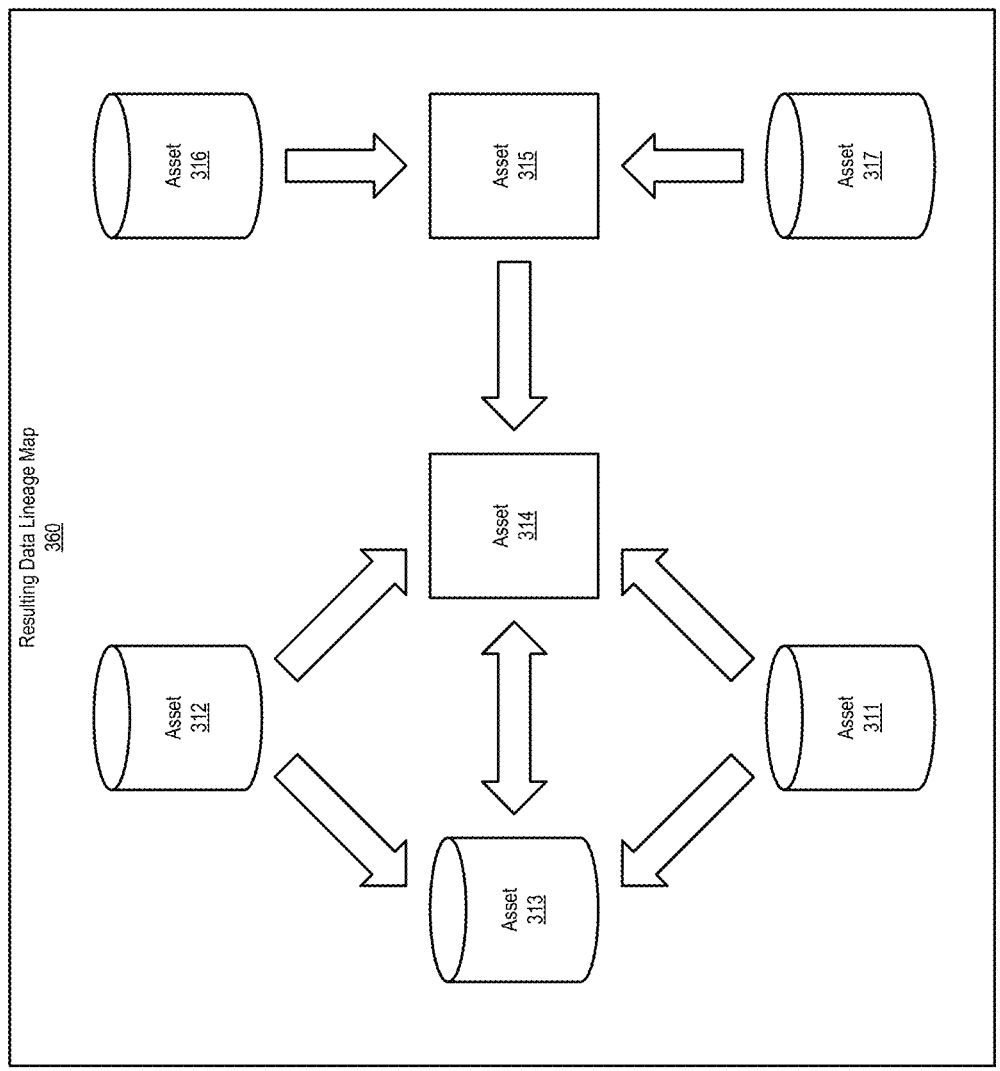
FIG. 3D shows an illustrative data lineage map of source assets and target assets involved in data transformations within the enterprise computing system in accordance with one or more aspects described herein.

FIG. 3D shows an illustrative data lineage map 360 of source assets and target assets involved in data transformations within the enterprise computing system 120 in accordance with one or more aspects described herein for FIGS. 3A, 3B, and 3C. The data lineage map 360 may be generated by the data lineage map generator 168 of the asset lineage module 160 within the enterprise computing system 120. The data lineage map 360 may generated based on the executed testing data derived from the data transformation 300, the data transformation 302, and the data transformation 304. The data lineage map 360 may include visual representations of the assets (e.g., 311, 312, 313, 314, 315, 316, and/or 317) as nodes. The relationships between the assets may be represented as links between the assets in accordance with FIGS. 3A, 3B, and 3C. Directional links may represent source to target relationships between assets. For example, asset 317 has a directional link towards asset 315 in accordance with the source to target relationship defined in data transformation 304 of FIG. 3C. Bidirectional links may represent source to target relationships between assets for each asset. For example, a bidirectional link exists between asset 313 and asset 314 in FIG. 3D in accordance with the source to target relationship defined in the data transformation 300 of FIG. 3A and the data transformation 302 of FIG. 3B. In some cases, the data lineage map 360 may be modified and/or altered to display the relationship (e.g., link) between feeds and/or data elements in place of the assets.

Figure 4:
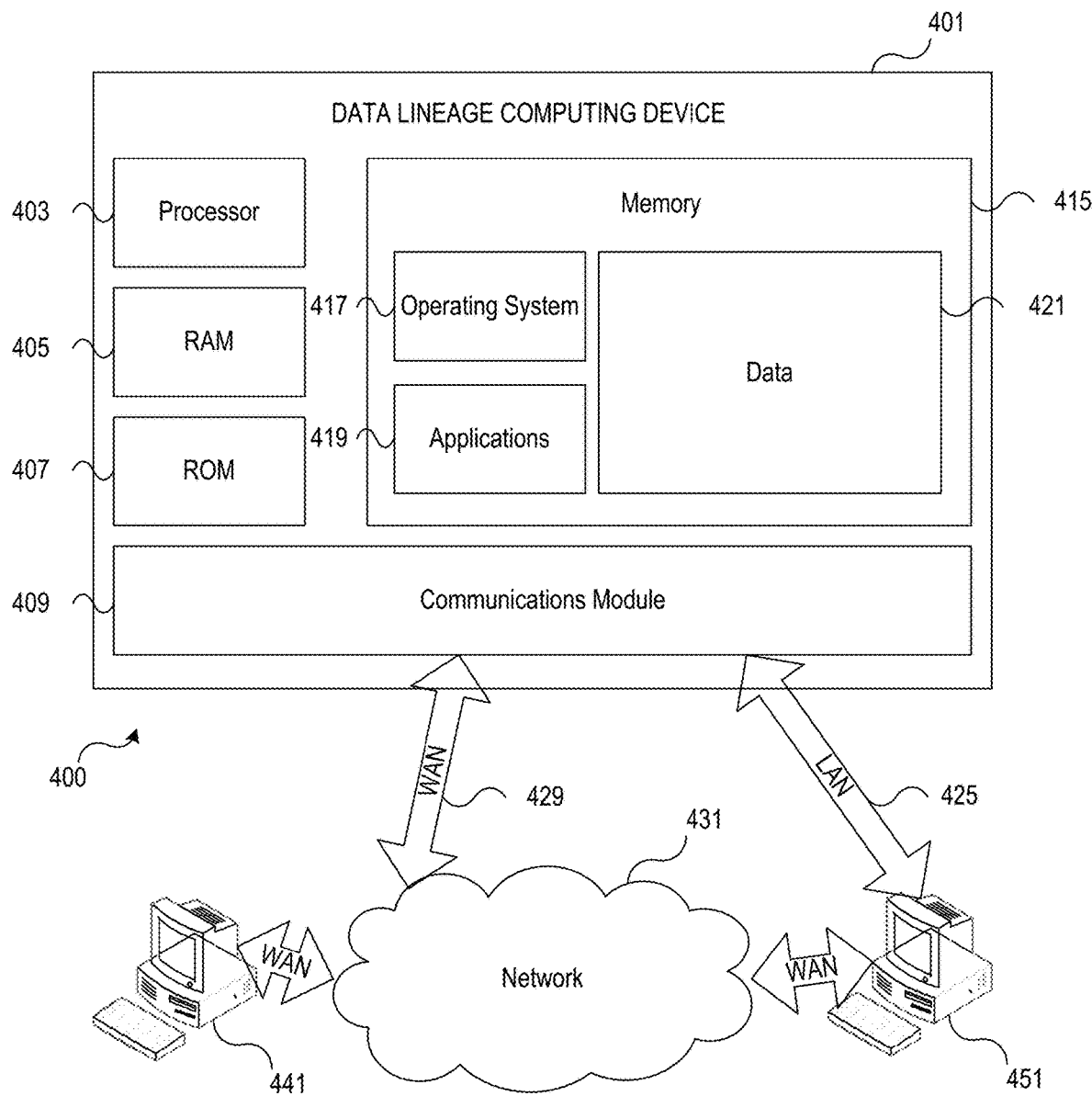
FIG. 4 shows an illustrative operating environment in which various aspects of the disclosure may be implemented in accordance with one or more aspects described herein.

FIG. 4 shows an illustrative operating environment in which various aspects of the present disclosure may be implemented in accordance with one or more example embodiments. Referring to FIG. 4, a computing system environment 400 may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the illustrative computing system environment 400.

The computing system environment 400 may include an illustrative data lineage computing device 401 having a processor 403 for controlling overall operation of the data lineage computing device 401 and its associated components, including a Random Access Memory (RAM) 405, a Read-Only Memory (ROM) 407, a communications module 409, and a memory 415. The data lineage computing device 401 may include a variety of computer readable media. Computer readable media may be any available media that may be accessed by the data lineage computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the data lineage computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments of the enterprise computing system 120 and/or the illustrative computing environment 100 is contemplated. For example, aspects of method steps of the disclosed herein may be executed by the processor 403 of the data lineage computing device 401. Such a processor may execute computer-executable instructions stored on a computer-readable medium.

Software may be stored within the memory 415 and/or other digital storage to provide instructions to the processor 403 for enabling the data lineage computing device 401 to perform various functions as discussed herein. For example, the memory 415 may store software used by the data lineage computing device 401, such as an operating system 417, one or more application programs 419, and/or an associated database 421. In addition, some or all of the computer executable instructions for the data lineage computing device 401 may be embodied in hardware or firmware. Although not shown, the RAM 405 may include one or more applications representing the application data stored in the RAM 405 while the data lineage computing device 401 is on and corresponding software applications (e.g., software tasks) are running on the data lineage computing device 401.

The communications module 409 may include a microphone, a keypad, a touch screen, and/or a stylus through which a user of the data lineage computing device 401 may provide input, and may include one or more of a speaker for providing audio output and a video display device for providing textual, audiovisual and/or graphical output. The computing system environment 400 may also include optical scanners (not shown).

The data lineage computing device 401 may operate in a networked environment supporting connections to one or more remote computing devices, such as the computing devices 441 and 451. The computing devices 441 and 451 may be personal computing devices or servers that include any or all of the elements described above relative to the data lineage computing device 401.

The network connections depicted in FIG. 4 may include a Local Area Network (LAN) 425 and/or a Wide Area Network (WAN) 429, as well as other networks. When used in a LAN networking environment, the data lineage computing device 401 may be connected to the LAN 425 through a network interface or adapter in the communications module 409. When used in a WAN networking environment, the data lineage computing device 401 may include a modem in the communications module 409 or other means for establishing communications over the WAN 429, such as a network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
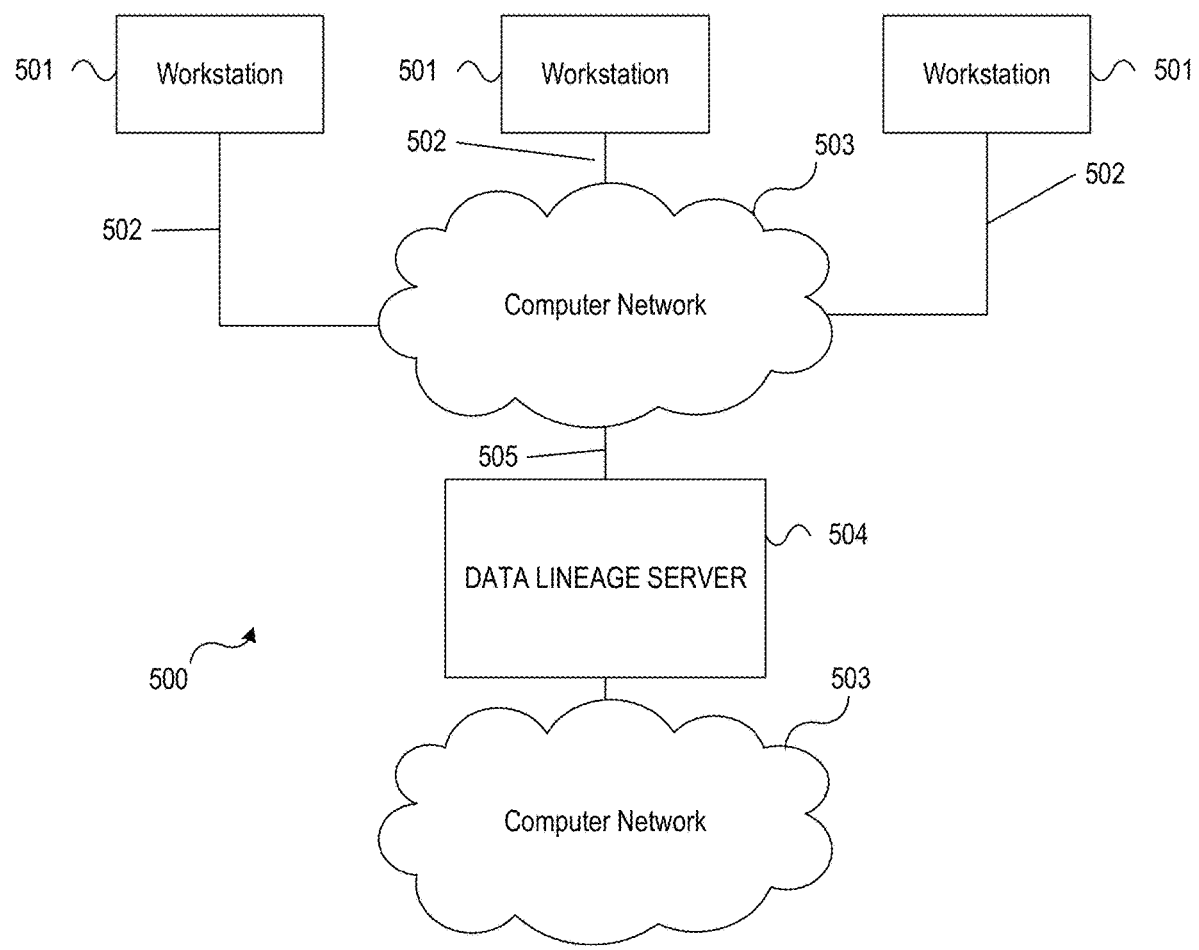
FIG. 5 shows an illustrative block diagram of workstations and servers that may be used to implement the processes and functions of certain aspects of the present disclosure in accordance with one or more aspects described herein.

FIG. 5 shows an illustrative block diagram of workstations and servers that may be used to implement the processes and functions of certain aspects of the present disclosure in accordance with one or more example embodiments. For example, an illustrative system 500 may be used for implementing illustrative embodiments according to the present disclosure. As illustrated, the system 500 may include one or more workstation computers 501. The workstation 501 may be, for example, a desktop computer, a smartphone, a wireless device, a tablet computer, a laptop computer, and the like, configured to perform various processes described herein. The workstations 501 may be local or remote, and may be connected by one of the communications links 502 to a computer network 503 that is linked via the communications link 505 to the data lineage server 504. In the system 500, the data lineage server 504 may be a server, processor, computer, or data processing device, or combination of the same, configured to perform the functions and/or processes described herein for the enterprise computing system 120 and/or the illustrative computing environment 100. The data lineage server 504 may be used to receive check images and associated data and/or validation scores, retrieve user profile, evaluate the check image compared to the user profile, identify matching or non-matching elements, generate user interfaces, and the like.

The computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 502 and 505 may be communications links suitable for communicating between the workstations 501 and the data lineage server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:
   at least one processor;
   a communication interface communicatively coupled to the at least one processor; and
   memory storing computer-readable instructions that, when executed by the at least one processor, cause the computing platform to:
   identify, by a data lineage engine, executed testing data associated with a test case of a data quality testing procedure for a data transformation, wherein the data transformation comprises conversion of at least one data element from each of a plurality of source assets to a data element of one or more target assets;
   identify, by the data lineage engine and based on the executed testing data, source data of the data transformation, target data of the data transformation, and link data comprising relationship information between the source data and the target data of the data transformation; and
   generate, by a data lineage map generator and based on the source data of the data transformation, the target data of the data transformation, and the link information, a data lineage map comprising a graphical representation of a relationship between the source data of the data transformation and the target data of the data transformation, wherein the data lineage map comprises nodes representative of source data and target data and directional links representative of source to target relationships of the source data elements and target data elements.

2. The computing platform of claim 1, wherein the instructions, when executed by the one or more processors, cause the computing platform to:
define, by a test case generator and based on received input from a computing device, parameters associated with the test case for the data transformation;
generate, by the test case generator, the test case for the data transformation; and
execute, by a test execution engine, the data quality testing procedure using the test case for the data transformation, wherein executing the data quality testing procedure yields the executed testing data.

3. The computing platform of claim 1, wherein the instructions, when executed by the one or more processors, cause the computing platform to:
analyze, by the data lineage engine, the source data of the data transformation to identify source assets, source feeds of the source assets, and source data elements of the source feeds; and
analyze, by the data lineage engine, the target data of the data transformation to identify a target asset, a target feed of the target asset, and a target data element of the target feed.

4. The computing platform of claim 1, wherein the instructions, when executed by the one or more processors, cause the computing platform to:
analyze, by the test execution engine, the executed testing data to validate the data transformation.

5. The computing platform of claim 1, wherein the instructions, when executed by the one or more processors, cause the computing platform to:
identify, by the data lineage engine, existing data lineage data for the data transformation.

6. The computing platform of claim 5, wherein the instructions, when executed by the one or more processors, cause the computing platform to:
compare, by the data lineage engine and based on identification of existing data lineage data for the data transformation, the source data of the data transformation and the target data of the data transformation to existing data lineage data for the data transformation.

7. The computing platform of claim 6, wherein the instructions, when executed by the one or more processors, cause the computing platform to:
replace, by the data lineage engine and based on the existing data lineage data for the data transformation, the existing data lineage data with the source data of the data transformation and the target data of the data transformation.

8. A method, comprising:
identifying, by a data lineage engine, executed testing data associated with a test case of a data quality testing procedure for a data transformation, wherein the data transformation comprises conversion of at least one data element from each of a plurality of source assets to a data element of one or more target assets;
identifying, by the data lineage engine and based on the executed testing data, source data of the data transformation, target data of the data transformation, and link data comprising relationship information between the source data and the target data of the data transformation; and
generating, by a data lineage map generator and based on the source data of the data transformation, the target data of the data transformation, and the link information, a data lineage map comprising a graphical representation of a relationship between the source data of the data transformation and the target data of the data transformation, wherein the data lineage map comprises nodes representative of source data and target data and directional links representative of source to target relationships of the source data elements and target data elements.

9. The method of claim 8, comprising:
defining, by a test case generator and based on received input, parameters associated with the test case for the data transformation;
generating, by the test case generator, the test case for the data transformation; and
executing, by a test execution engine, the data quality testing procedure using the test case for the data transformation, wherein executing the data quality testing procedure yields executed testing data.

10. The method of claim 8, comprising:
analyzing, by the data lineage engine, the source data of the data transformation to identify source assets, source feeds of the source assets, and source data elements of the source feeds; and
analyzing, by the data lineage engine, the target data of the data transformation to identify a target asset, a target feed of the target asset, and a target data element of the target feed.

11. The method of claim 8, comprising:
analyzing, by the test execution engine, the executed testing data to validate the data transformation.

12. The method of claim 8, comprising:
identifying, by the data lineage engine, existing data lineage data for the data transformation.

13. The method of claim 12, comprising:
comparing, by the data lineage engine and based on identification of existing data lineage data for the data transformation, the source data of the data transformation and the target data of the data transformation to existing data lineage data for the data transformation.

14. The method of claim 13, comprising:
replacing, by the data lineage engine and based on the existing data lineage data for the data transformation, the existing data lineage data with the source data of the data transformation and the target data of the data transformation.

15. One or more non-transitory computer-readable media storing instructions that, when executed by a computing platform comprising at least one processor, memory, and a communication interface, cause the computing platform to:
define, by a test case generator and based on received input from a computing device, parameters associated with a test case for a data transformation;
generate, by the test case generator, the test case for the data transformation;
execute, by a test execution engine, a data quality testing procedure using the test case for the data transformation, wherein executing the data quality testing procedure using the test case for the data transformation yields executed testing data of the test case for the data transformation;
identify, by a data lineage engine, executed testing data associated with the test case of the data quality testing procedure for the data transformation, wherein the data transformation comprises conversion of at least one data element from each of a plurality of source assets to a data element of one or more target assets;

identify, by the data lineage engine and based on the executed testing data, source data of the data transformation, target data of the data transformation, and link data comprising relationship information between the source data and the target data of the data transformation; and generate, by a data lineage map generator and based on the source data of the data transformation, the target data of the data transformation, and the link information, a data lineage map comprising a graphical representation of a relationship between the source data of the data transformation and the target data of the data transformation, wherein the data lineage map comprises nodes representative of source data and target data and directional links representative of source to target relationships of the source data elements and target data elements.

16. The one or more non-transitory computer-readable media of claim 15, wherein the instructions, when executed by the one or more processors, cause the computing platform to:

analyze, by the data lineage engine, the source data of the data transformation to identify source assets, source feeds of the source assets, and source data elements of the source feeds; and analyze, by the data lineage engine, the target data of the data transformation to identify a target asset, a target feed of the target asset, and a target data element of the target feed.

17. The one or more non-transitory computer-readable media of claim 15, wherein the instructions, when executed by the one or more processors, cause the computing platform to:

analyze, by the test execution engine, the executed testing data to validate the data transformation.

18. The one or more non-transitory computer-readable media of claim 15, wherein the instructions, when executed by the one or more processors, cause the computing platform to:

identify, by the data lineage engine, existing data lineage data for the data transformation.

19. The one or more non-transitory computer-readable media of claim 18, wherein the instructions, when executed by the one or more processors, cause the computing platform to:

compare, by the data lineage engine and based on identification of existing data lineage data for the data transformation, the source data of the data transformation and the target data of the data transformation to existing data lineage data for the data transformation.

20. The one or more non-transitory computer-readable media of claim 19, wherein the instructions, when executed by the one or more processors, cause the computing platform to:

update, by the data lineage engine and based on the existing data lineage data for the data transformation, the existing data lineage data with the source data of the data transformation and the target data of the data transformation.

* * * * *